(12) United States Patent
Emerson

(10) Patent No.: US 7,278,677 B2
(45) Date of Patent: Oct. 9, 2007

(54) QUICK CAB COVER AND ATTACHMENT SYSTEM FOR JEEP®-TYPE VEHICLE

(76) Inventor: Jason Sterling Emerson, 10818 Avenida Playa Veracruz, San Diego, CA (US) 92124

( * ) Notice: Subject to any disclaimer, the term of this patent is extended or adjusted under 35 U.S.C. 154(b) by 62 days.

(21) Appl. No.: 11/177,449

(22) Filed: Jul. 9, 2005

(65) Prior Publication Data

US 2006/0022483 A1    Feb. 2, 2006

Related U.S. Application Data

(60) Provisional application No. 60/591,631, filed on Jul. 28, 2004.

(51) Int. Cl.
*B60J 11/04* (2006.01)
(52) U.S. Cl. .............. 296/136.04; 296/136.12
(58) Field of Classification Search .......... 296/136.01, 296/136.04, 136.1, 136.11, 136.12, 136.13, 296/102; 150/166
See application file for complete search history.

(56) References Cited

U.S. PATENT DOCUMENTS

| | | | | |
|---|---|---|---|---|
| 2,716,433 A | * | 8/1955 | Rawlings | 150/166 |
| 2,874,709 A | * | 2/1959 | Cohen et al. | 150/166 |
| 5,033,787 A | * | 7/1991 | Takada | 296/102 |
| 5,409,286 A | * | 4/1995 | Huang | 296/136.04 |
| 5,582,454 A | * | 12/1996 | Grover | 296/107.09 |
| 5,597,197 A | * | 1/1997 | Mowar et al. | 296/136.04 |
| 5,979,968 A | * | 11/1999 | Essig et al. | 296/102 |
| 6,206,454 B1 | * | 3/2001 | Cory | 296/146.2 |
| 6,286,888 B1 | * | 9/2001 | Essig | 296/102 |
| 6,641,203 B1 | * | 11/2003 | Everett | 296/136.11 |
| 2003/0098108 A1 | * | 5/2003 | Littlefield | 150/106 |

* cited by examiner

*Primary Examiner*—Dennis H Pedder
*Assistant Examiner*—Melissa A Black
(74) *Attorney, Agent, or Firm*—Pillsbury Winthrop Shaw Pittman LLP

(57) ABSTRACT

A JEEP®-type vehicle cover and attachment system formed of lightweight, form-fitting waterproof/water-resistant material. A shaped bracket attached to the cover secures the cover to a rear portion of the vehicle. The cover when deployed completely protects the entire interior of the vehicle and the side mirrors. An adjustable elastic cord sewn into the periphery of the cover secures the cover at the sides and front of the vehicle. A cover storage pocket hangs from the bracket at the rear of vehicle. A bow creates a dome over the front passenger compartment to avoid pooling of water when the cover is deployed in heavy rain.

8 Claims, 6 Drawing Sheets

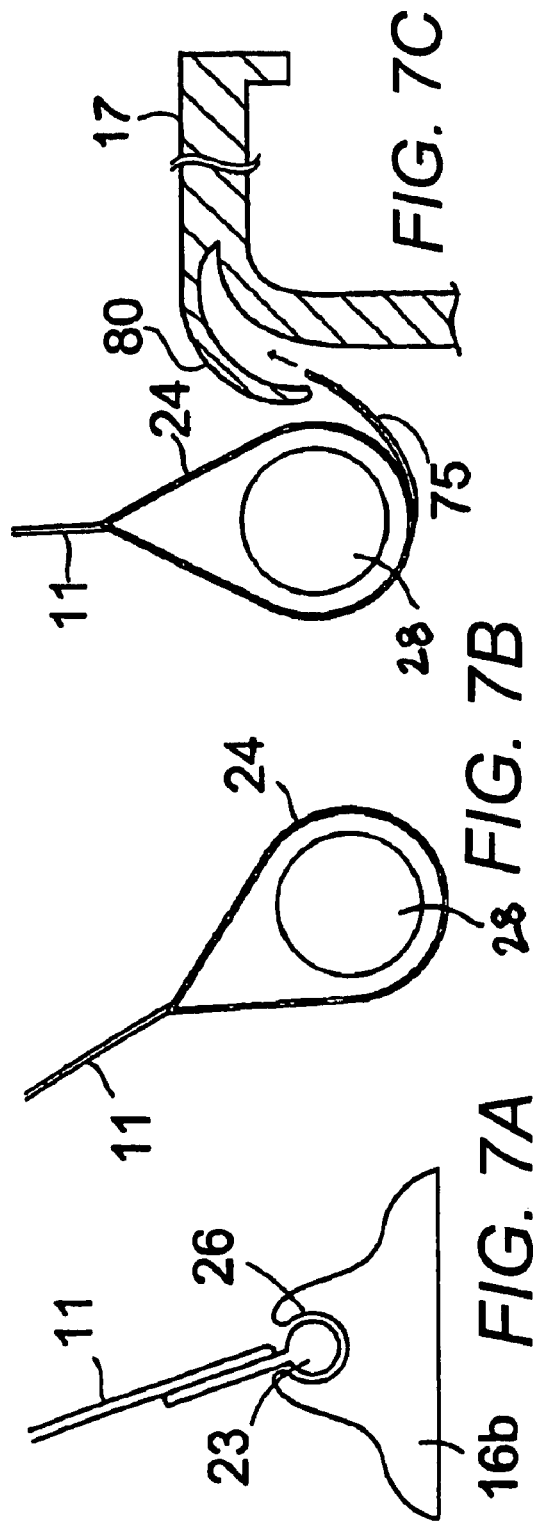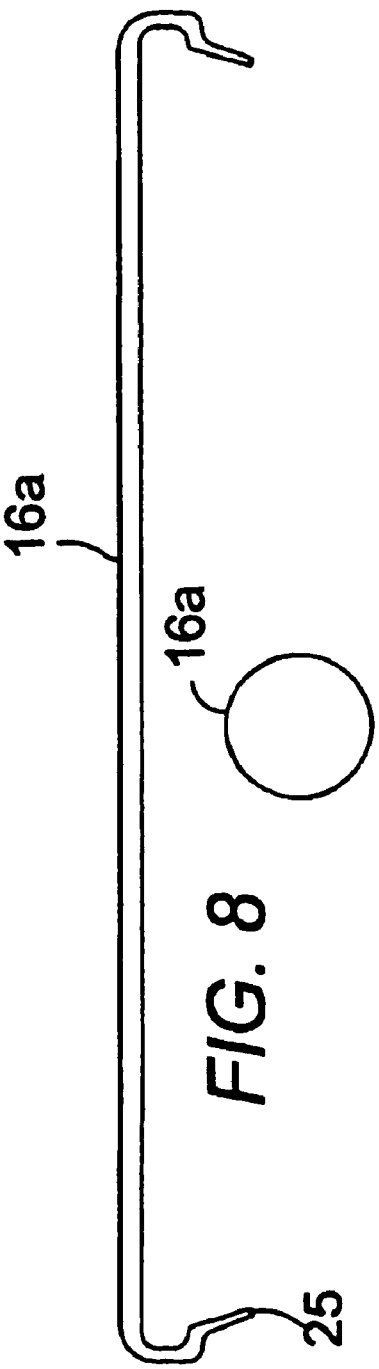

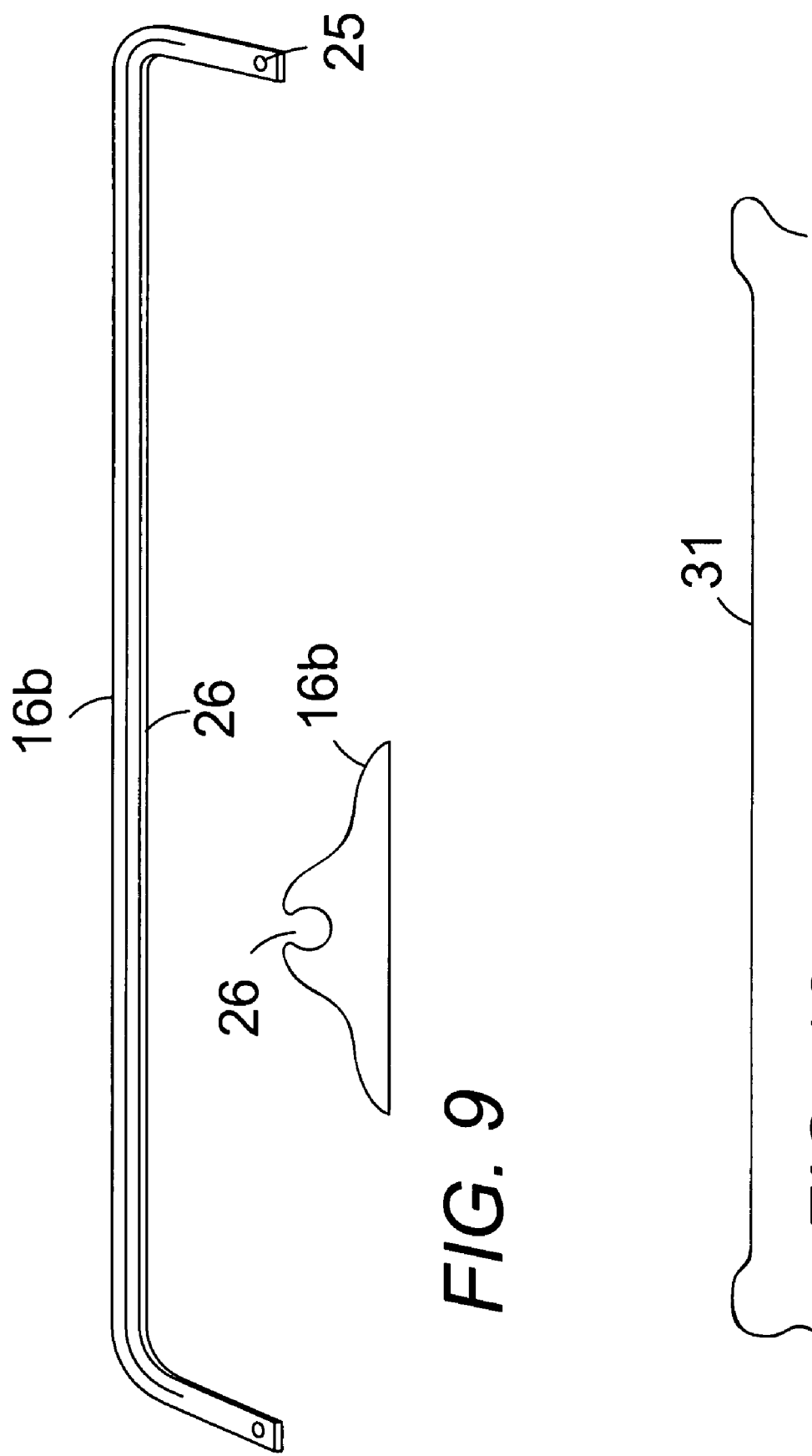

QUICK CAB COVER AND ATTACHMENT SYSTEM FOR JEEP®-TYPE VEHICLE

CLAIM OF PROVISIONAL APPLICATION RIGHTS

This application claims the benefit of U.S. Provisional Patent Application No. 60/591,631, filed on Jul. 28, 2004.

BACKGROUND OF THE INVENTION

1. Field of the Invention

The present invention relates generally to the field of protective covers for automobiles and more specifically to an easily deployed cover and attachment system for JEEP®-type or open recreational vehicles and a connecting system which fastens the cover to the vehicle in a secure fashion.

2. Description of the Prior Art

When owning a JEEP®-type vehicle the convertible top does not open and close with a push of a button as other convertible vehicles perform. With a JEEP®-type vehicle the top, when removed or reclined, usually stays removed for an extended period of time. When the traditional top is reclined the interior of a JEEP®-type vehicle is exposed to many harmful elements. The sun causes the interior to fade and crack, the rain can cause mildew and condensation in the dash, morning dew although not rain can certainly dampen the exposed interior of a vehicle and dust blowing around settles into the interior. All of these elements can rapidly age and ruin the exposed interior of a vehicle. Animals, such as cats or dogs tend to climb into a JEEP®-type vehicle, while the top is removed and urinate or bring more dirt into the vehicle. Bird droppings and leaves or sap from trees tend to end up in an exposed interior. Leaving items unattended in an open cab vehicle also invites a criminal element to steal those items. People dislike all of this exposure to elements that ruin a vehicle. Theft of belongings also occur when a criminal element can easily reach inside a vehicles cab. This damage to the interior can be prevented by covering the vehicle when parked, which also aids in the prevention of theft. The cover must be very quick and easy to deploy, to be a suitable option for daily use. A cover that takes seconds to deploy, that can be easily stowed and that effectively can be a part of a JEEP®-type vehicle people is the best solution.

U.S. Pat. No. 5,364,155, issued Nov. 15, 1994 to Kuwahara, provides a car cover that has a bag for storing the cover. The bag can be stably mounted on the trunk, and in this state the cover can be put on the car smoothly. A pair of triangular sheets are connected to the bag. The bag is secured to the cover member through a gusset provided between the triangular sheets. A belt connected to the free ends of the triangular sheets is put around the hinges in the trunk room. A mounting sheet is stitched to the edge of the opening of the bag and is fastened to the interior surface of the trunk by hook-and-loop fasteners provided near its front edge. After supporting the bag on the rear wall of the trunk by fastening the triangular sheets and the mounting sheet, the trunk door is closed and the cover member is taken out of the bag and put on the car. The locking mechanism of the trunk door can pass through a gap between the triangular sheets or a hole formed in the mounting sheet, so that the trunk door can be closed and locked U.S. Pat. No. 6,092,857, issued Jul. 25, 2000 to Rivas, shows a car cover assembly incorporating a container that is adapted to be anchored to a portion of an automobile. The car cover assembly includes an anchor member in the form of an elongate pipe or tube that is attached to the container containing the cover via straps. The pipe is adapted to be deposited in the trunk of the automobile and the trunk lid can then be closed on the straps so as to anchor the container to the rear end of the automobile. The cover is stored within a cavity defined by the container and the cover includes a handle which is accessible by the user. The user grasps the handle and extracts the cover from the container while the container is anchored to the rear end of the automobile and then correctly positions the cover about the automobile.

U.S. Pat. No. 4,795,207, issued Jan. 3, 1989 to Clarke, discloses a vehicle cover useful for small trucks such as pickups and vans, comprising a central panel having a width of about the width of the vehicle and a length slightly longer than the side elevational profile taken along the front, top and back of the vehicle; a pair of side panels having a shape generally corresponding to the side elevational profile of said vehicle; the side panels being attached to the central panel along the length thereof to form junction seams which define a pair of parallel vertical planes spaced apart by the width of the vehicle; and an elastic band member having a relaxed state slightly less than the rectangle defined by the length and width of the vehicle, the band being circumscribed by the lower terminal edge of the panels. Clarke is too cumbersome by covering the entire vehicle and does not have a reliable means for preventing complete removal. Clarke's design would take too long to deploy to produce the desired effect of daily protection for an exposed interior.

U.S. Pat. No. 5,409,286, issued Apr. 25, 1995 to Huang, shows a protective cover apparatus for the passenger compartment of an automobile that includes a cover, a semi-pliable metal hook linked to a handhold on the cover by a cord for securing the cover to the front of the automobile, a storage pouch for storing the cover and an adjustable belt fixed to the storage pouch for securing the pouch and the cover to the trunk of the automobile. In a second arrangement, the front end of the cover is secured to the windshield by suction pads under the handhold. The storage pouch is replaced by a pair of tie-down straps and a roll-up sheet. The tie-down straps tie the folded cover to the roll-up sheet before the roll-up sheet wraps up the cover for storage. Both arrangements are similar in operation but have different advantages in manufacturing. The first arrangement is capable of fitting automobiles of different sizes or styles with one single size while the second arrangement requires specific sizing to fit.

U.S. Pat. No. 5,244,245, issued Sep. 14, 1993 to Kashino, is for embodiments of a vehicle top cover, each having a roof panel and two flexible side panels that form a vehicle-top shape and a means for holding down the rear of the vehicle top cover on the vehicle. The roof panel covers most of the front window, roof, and back window, and is held down on the front window by the windshield wipers or, optionally, is tied to the wipers. The side panels extend from the roof panel and are shut in the vehicle doors to secure the cover to the vehicle and to hang down inside the vehicle interior along the inside of the side windows. The rear edge of the vehicle top cover may be held down by a flap or a weighted flap that is shut in the trunk or by a weight attached to the rear edge of the vehicle top cover that lies on the outside of the vehicle. The flap may also be a stuff bag which is turned inside out and stuffed with the roof panels and side panels for storage.

U.S. Pat. No. 6,641,203, issued Nov. 4, 2003 to Everett, claims a windproof and theft proof vehicle cover having a retaining piping disposed along an edge thereof to tether the cover to a vehicle or other object. Retaining piping is preferably disposed such that a portion of the cover passes through an opening in the vehicle and the retaining piping cannot pass through the opening, thereby preventing the removal of the cover from the vehicle.

U.S. Pat. No. 4,799,728, issued Jan. 24, 1989 to Akers, describes a cover for a vehicle body including a hood fixed to a bag by a strap, which bag can be placed inside a vehicle door and the door closed to prevent unauthorized removal. The bag is also sized to contain the cover for storage. Additionally, a hook assembly including a semi-pliable member is fixed to the strap and used to hold the hood on the vehicle while allowing easy adjustment of the strap length. Akers does not have rear of cover permanently attached and strap from pocket to cover could easily be severed to allow removal of top.

U.S. Pat. No. 4,596,418, issued Jun. 24, 1986 to Koh, indicates a vehicle cover for protecting a vehicle having a front, a trunk, an outer surface, and an underside. The cover has a shape corresponding to the outer surface of the vehicle and also has an inside surface, a front, two opposite sides, and a rear. A connecting member is attached to the inside surface at the rear of the cover while a ring member is fixed inside of the trunk of the vehicle. A string fixes the connecting member to the ring member. Hooks are attached to the underside of the vehicle along the two opposite sides of the vehicle while holes, made along edges of the two opposite sides of the cover, secure the cover to the hooks attached to the underside of the vehicle. Koh is not suitable for a vehicle without an existing trunk such as a jeep-type vehicle.

U.S. Pat. No. 4,952,007, issued Aug. 28, 1990 to Shahrokh, puts forth a cover for protecting vehicle used to transport people and a releasable connecting system which releasably connects the cover to vehicle outside of vehicle. The cover is a flexible sheet that is sized and shaped to cover the exterior surfaces of the passenger compartment of vehicle. The opaque and reflective qualities of cover prevent compartment from getting uncomfortably hot or damaged from exposure to summer sun. Use of cover during winter shields the vehicle's windows from ice and snow. The cover and connecting system also serve to deter and resist entry of unauthorized persons into vehicle. The first typical embodiment of the connecting system includes arm, fastener, and anchor. The arm is an elongated member with one end joined to cover and the other end releasably connected by fastener to anchor. The fastener is accessible from outside vehicle. The anchor is initially attached to vehicle by sliding anchor on vehicle's door edge. The anchor pinches door edge and can be removed from door only when door is open. The anchor remains attached to vehicle when the cover is on vehicle or removed from vehicle. For any embodiment of cover and connecting system, no doors or other closure members need to be opened to allow removal of cover from vehicle. The Shahrokh patent does not have a permanent attachment to vehicle when stowed making the design more time consuming and difficult to deploy and also lacks proper attachment around the front of the vehicle to prevent wind disturbance.

U.S. Pat. No. 2,716,433, issued Aug. 30, 1955 to Rawlings, concerns a protective covering for the turret portion of turret type automobiles including front side and rear windows. The cover comprises a rectangular sheet of flexible waterproof material for placing over the turret portion of the automobile, a plurality of spaced eyes affixed to the outer side of the perimeter of said sheet, a cord disposed through said eyes and having its end portions exposed to permit drawing the edge portion tightly about the lower of the turret portion of the automobile. The sheet has reinforced tape located at the portions that will engage the front and rear of the turret type automobile body. The sheet also is provided with a pair of stretchable straps extending from each longer side of said sheet. Each strap has a hook embedded in its free end portion for further securing the sheet.

U.S. Pat. No. 2,950,749, issued Aug. 30, 1960 to MacDonald, illustrates a quick attachable and detachable cover for the open seating compartment of convertible vehicles. The cover comprises a rectangular lightweight plastic sheet having sleeves on the rear and forward edges thereof. A pair of flexible resilient cables having hooks on each of their ends are provided, one cable is loosely threaded through each sleeve. Once the cover is placed over the seating area, the hooks are engaged with the fenders of the vehicle to secure the cover in place. MacDonald does not provide a means for permanent attachment and prevention of unauthorized removal. MacDonald's cover would also take longer than the present invention to deploy again making the design less practical for daily use.

U.S. Pat. No. 2,801,667, issued Aug. 6, 1957 to Curran, is for a cover which protects the upper portion of an automobile. The cover comprises a waterproof, flexible rectangular sheet with U-shaped loops on its forward and rear ends that engage a portion of the vehicle's respective bumpers. The sheet further comprises a hem around its peripheral edge, which creates a sleeve for holding a cinching cord for further securing the cover to the automobile. Curran (1957) has a tension adjustment in periphery of top but does not stay attached to vehicle when stowed and would take too long to deploy. Curran's design also protects the entire vehicle causing the invention to be too impractical for daily use.

U.S. Pat. No. D384,324, issued Sep. 30, 1997 to Barker, provides the ornamental design for a removable fabric top for off-road vehicles.

What is needed is an easily deployed cover and attachment system for JEEP®-type vehicles and a connecting system which fastens the cover to the vehicle in a secure fashion.

SUMMARY OF THE INVENTION

The primary object of the invention is to provide an easy to use cover to protect an exposed passenger compartment of a JEEP®-type vehicle from a variety of harmful elements both natural and man-made.

Another object of the present invention is to provide a bracket attachment and pocket at the rear of the present invention as a permanent attachment to the vehicle when stowed making the design less time consuming and easier to deploy.

One more object of the present invention is to provide an adjustable elastic attachment around the front of the vehicle to prevent wind disturbance.

An additional object of the present invention is to provide a rear of the cover permanently attached by a bracket bolted to the rear of the vehicle to prevent unauthorized removal of the cover.

Another object of the invention is to provide a vehicle cover that can be permanently attached to JEEP®-type vehicles allowing easy access and a method to prevent unauthorized removal of the cover.

Another object of the invention is to provide a vehicle cover that can be deployed or removed and stowed, quickly and easily.

Another object of the invention is to provide a vehicle cover that can be held securely in place without the use of cumbersome straps and buckles.

Another object of the invention is to provide a vehicle cover that will hide valuables from public view on JEEP®-type vehicles.

Yet another object of the invention is to provide a vehicle cover that is used daily to protect the interior of a JEEP®-type vehicle from rain, sun, dust and more when the convertible top is down/removed.

Still yet another object of the invention is to provide a vehicle cover that becomes an actual functional part of a JEEP®-type vehicle.

Further objects are to provide a connecting system which is secure, easy to install and does not require any vehicle modification.

In brief, the present invention involves an easily deployed cover and attachment system for a JEEP®-type vehicle. This invention has a lightweight, semi-form fitted waterproof/water-resistant cover to fit over at least a portion of the vehicle body, protecting the passenger compartment, and an attachment system comprising; a bracket and an adjustable elastic cord sewn into the periphery of the cover. The elastic is used to hold the deployed cover firmly in place by restricting the radius of the periphery of the cover, which disallows the edges of the cover from retracting over the side mirrors of the vehicle. The bracket is clipped or bolted to the rear of the bed of the vehicle for secure attachment of the rear base of the cover when stored or deployed. For ease of storage and accessibility a pocket sewn into the rear base of the cover hangs from the attachment bracket. When the cover is not needed the pocket stows the cover neatly and protects the cover from wind disturbance while driving.

Other features of the invention include a bow that rests above the front passenger compartment preventing rain from pooling in wet weather. A side skirt covers the gap between the cover and the rear bed of the JEEP®-type vehicle adding further protection to the interior. The shape of the bracket will allow a soft top to be installed without the removal of the cover.

An advantage of the present invention is that it provides an easy to use cover to protect an exposed passenger compartment of a JEEP®-type vehicle.

Another advantage of the present invention is that it provides a permanent attachment and pocket making it less time consuming and easier to deploy.

One more advantage of the present invention is that it provides an adjustable elastic attachment around the front of the vehicle to prevent wind disturbance.

An additional advantage of the present invention is that it prevents unauthorized removal of the cover.

Another advantage of the present invention is that it allows easy access to the cover while preventing unauthorized removal of the cover.

Another advantage of the present invention is that it can be deployed or removed and stowed, quickly and easily.

Another advantage of the present invention is that it provides a vehicle cover that can be held securely in place without the use of cumbersome straps and buckles.

Another advantage of the present invention is that it provides a vehicle cover that will hide valuables from public view on JEEP®-type vehicles.

Yet another advantage of the present invention is that it provides a vehicle cover that can be used daily.

Still yet another advantage of the present invention is that it becomes an actual functional part of a JEEP®-type vehicle.

Further advantages of the present invention is that it provides a connecting system which is secure, easy to install and does not require any vehicle modification.

BRIEF DESCRIPTION OF THE DRAWINGS

These and other details of my invention will be described in connection with the accompanying drawings, which are furnished only by way of illustration and not in limitation of the invention, and in which drawings:

FIG. 7A is a cross sectional view of the means of attaching the cover to the bracket (16b);

FIG. 7B is a cross sectional view of the means of attaching the cover to the bracket (16a);

FIG. 7C is a cross sectional view of the bottom of the cover with an attached cover hook aligned to mate with a mating body hook on the body of the vehicle;

FIG. 8 is a perspective view of the first typical embodiment of the bracket with the first typical shape used for fastening the cover to the rear of the JEEP®-type vehicle;

FIG. 9 is a perspective view of the second typical embodiment of the bracket with the first typical shape used for fastening the cover to the rear of the JEEP®-type vehicle;

FIG. 10 is a perspective view of the second typical shape of the bracket;

BEST MODE FOR CARRYING OUT THE INVENTION

Figure 1:
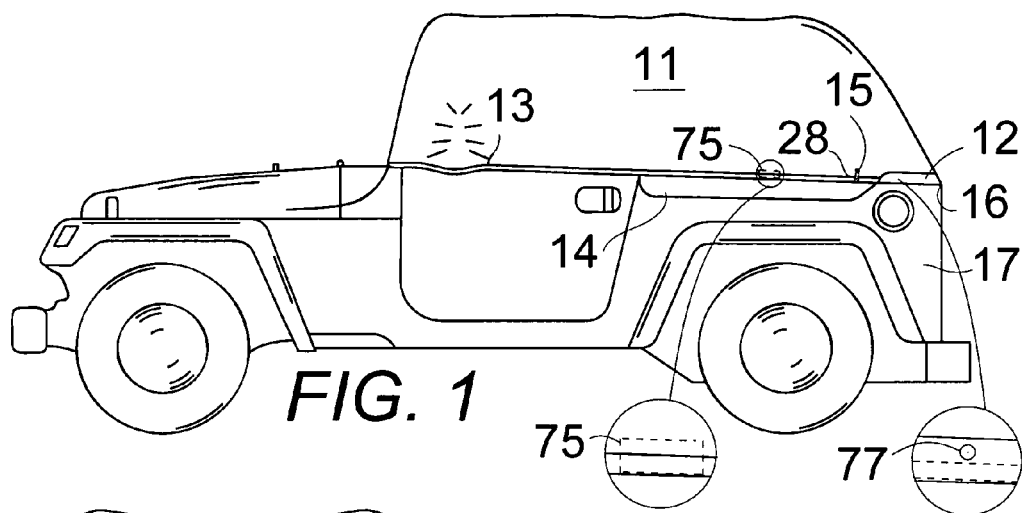
FIG. 1 is a perspective view of a typical embodiment of the cover of the present invention showing a JEEP®-type vehicle, a deployed cover protecting the vehicles passenger compartment, the connection system at the rear of the vehicle, and the tension adjustment.
Figure 2:
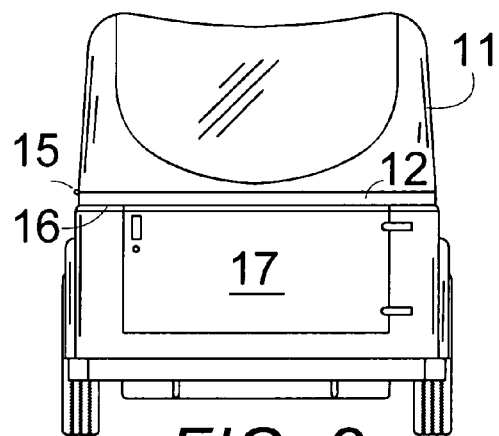
FIG. 2 is a perspective view similar to FIG. 1, but showing the JEEP®-type vehicle and deployed cover from the rear.
Figure 3:
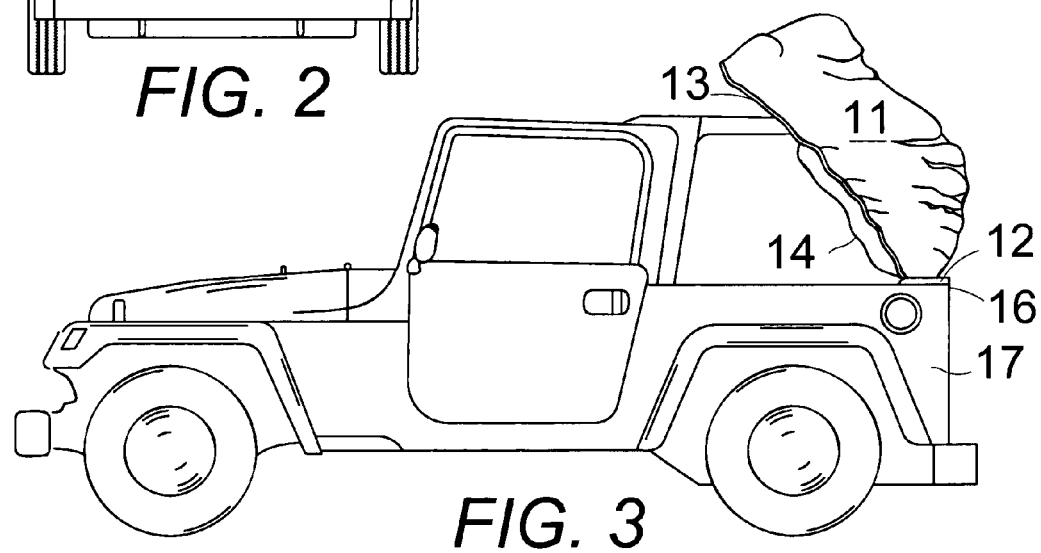
FIG. 3 is a perspective view similar to FIG. 1, but showing the cover partially retracted exposing the passenger compartment of the vehicle.
Figure 4:
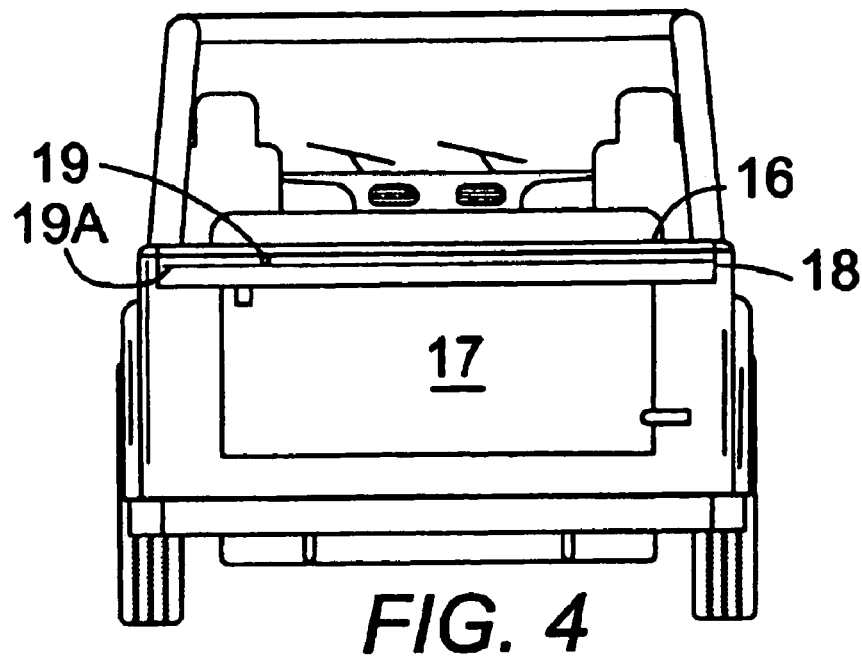
FIG. 4 is a perspective transparent view of the typical embodiment of the cover showing the rear of a JEEP®-type vehicle with a transparent rear and the stowed cover hanging from the bracket on the interior of the trunk space of the vehicle.

In FIGS. 1-13, a lightweight waterproof cover 11 of the present invention for a JEEP.RTM.-type vehicle 17 is easily deployed from a storage pocket 18 to completely cover an interior of the vehicle when the normal soft/hard top is removed, as shown in FIGS. 1 and 2. In FIGS. 3 and 4, the cover 11 is easily retracted and stored in a pocket 18 to leave the vehicle interior open. The jeep-type vehicle 17 is any vehicle similar to the standard variety currently produced by DaimlerChrysler AG.

In FIGS. 5-9, the attachment system for the cover 11 comprises a bracket 16, which offers secure attachment to the rear of the vehicle 17 and an elongated edging element 28 with a tensioning means around the bottom edge of the cover. The bracket 16 may have different embodiments, such as U-shaped metal, as seen in FIGS. 8 and 9 and may include reinforced material 12 at the bracket attachment at the rear of the cover 11 as shown in FIGS. 1, 2, and 3. The elongated edging element may comprise elastic, cloth, or a cord, such as an elastic cord 28 shown in FIGS. 11 and 12, with a tension adjustment 15, sewn into the periphery of the cover 11 for stretching the edges of the cover around the vehicle and holding the cover in place by the tension of the cord. The tension adjustment 15 shown in an enlarged detail of FIG. 11, comprises a ring 15 through which a loop of the elastic cord 28 is inserted so the that the ring 15 slides away from an end of the cord loop to enlarge the loop for tightening the cord or slides toward the end of the cord loop to shorten the loop for loosening the cord. A grommet 27 may be provided to form a hole through which the elastic cord 28 extends out from the cover 11.

In FIGS. 7A and 7B, the cover 11 is securely attached to the bracket in any of a plurality of ways not limited to the options in FIGS. 7a and 7b. Looking at FIG. 7A the rear of the cover 11 has a rubber cord with a flat portion 23 sewn the cover 11. In FIG. 7A, the round part of the rubber cord 23 would be inserted into a channel 26 in the bracket 16b (see FIG. 9) allowing the cover 11 to be attached to or removed from the bracket 16b while the bracket 16b remained secured to the vehicle 17. In FIG. 7B, the cover 11 would have a channel 24 sewn into the rear portion for the bracket 16a (see FIG. 8) to be inserted. This connection method in FIG. 7B would require the bracket 16a to be inserted into the cover 11 prior to the bracket 16a being bolted or clipped to the vehicle 17. This means of attaching the cover 11 to the bracket 16a in FIG. 7B would aid in preventing unauthorized removal of the cover 11.

In FIG. 7C at least one cover hook 75, and preferably a series of cover hooks, on each side of a bottom edge of the cover 11 and at least one mating body hook 80 for each of the cover hooks on the vehicle body 17 so that the cover hooks may be secured on the body hooks to hold the cover down.

Figure 6:
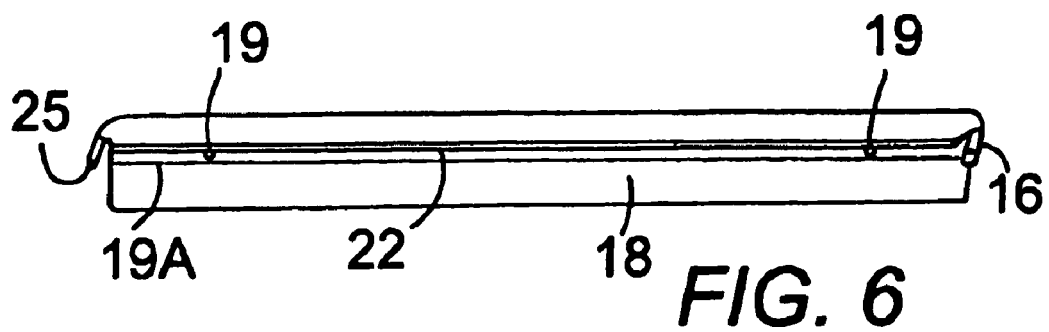
FIG. 6 is a perspective view of the stowed cover and connection system separate from the vehicle.

In FIGS. 4 and 6, once the cover 11 is attached to the bracket 16, the cover 11 can be stored in a pocket 18 at the rear base of the cover 11 which hangs from the bracket 16 on the interior of the vehicle 17 (see FIG. 4). In FIG. 6, the pocket 18 comprises elastic 22 at the upper opening of the pocket 18, and a closing flap having mating strips of hook and loop fasteners 19A for closing the pocket or at least one or two snaps 19 to keep the pocket 18 closed when the cover 11 is stowed. In FIG. 4, the pocket 18 can be seen hanging from the bracket 16 on the interior of the rear bed of the vehicle 17.

Figure 5:
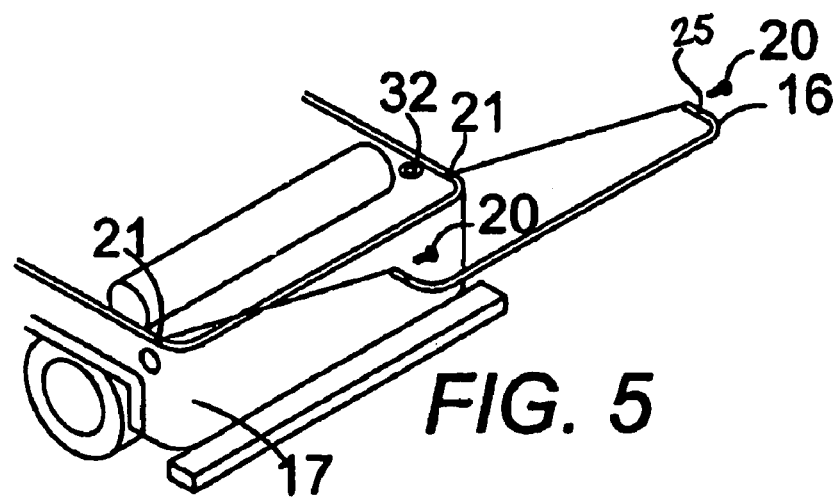
FIG. 5 is an exploded view of the connection system showing how the bracket would fasten to the rear of the JEEP®-type vehicle.

In FIG. 5, the bracket 16 is secured to the rear bed of the vehicle 17 by bolts 20 inserted through a hole 25 in the bracket 16 and a pre-existing hole 21, in the bed of a JEEP®-type vehicle 17, and a nut 32. The cover 11 stored in the pocket 18, attached before or after the bracket is secured depending on the bracket 16 type, would hang securely from the bracket as seen in FIGS. 4 and 6.

Figure 11:
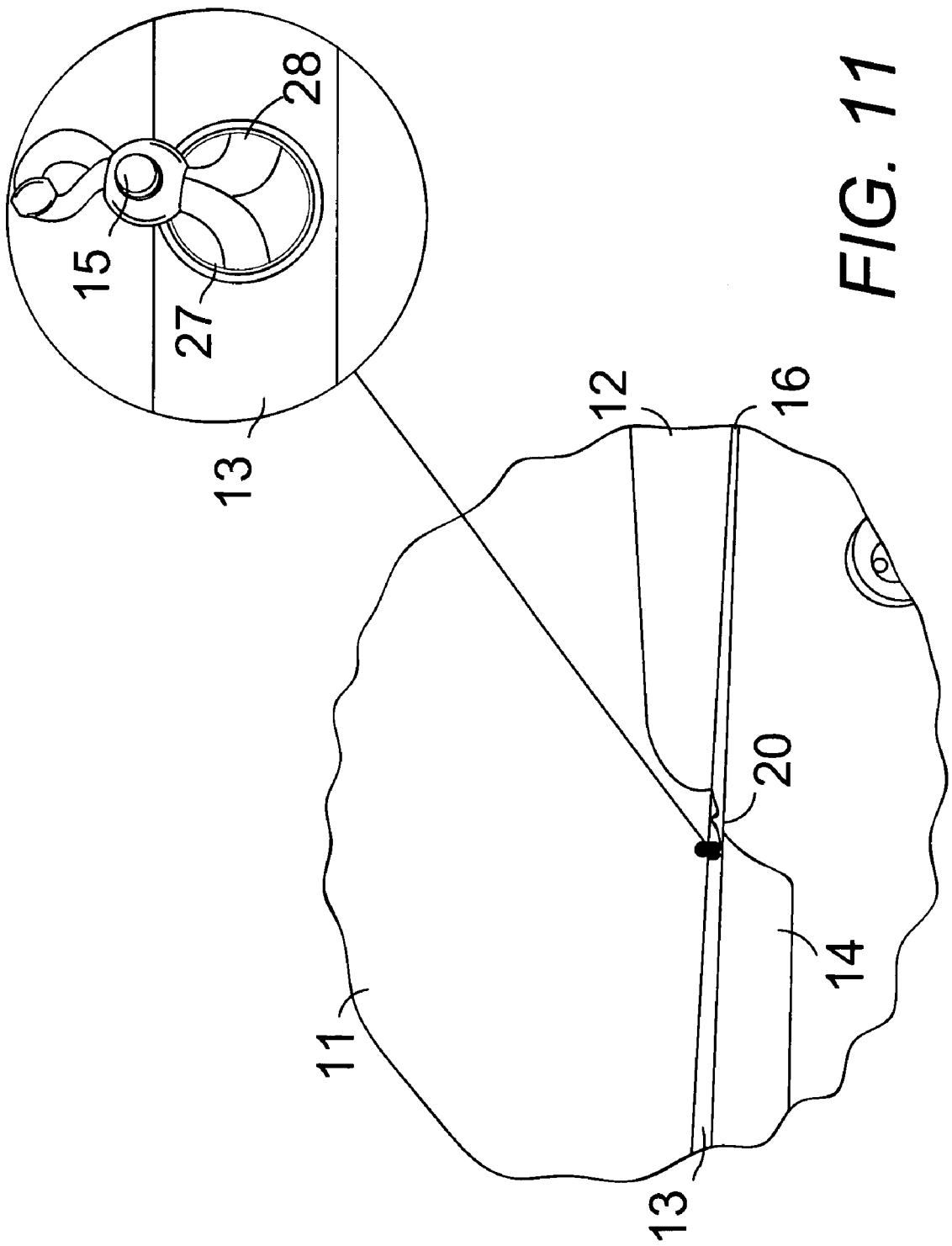
FIG. 11 is an enlarged perspective view similar to FIG. 1 with a focus on the connection system and tension adjustment.
Figure 12:
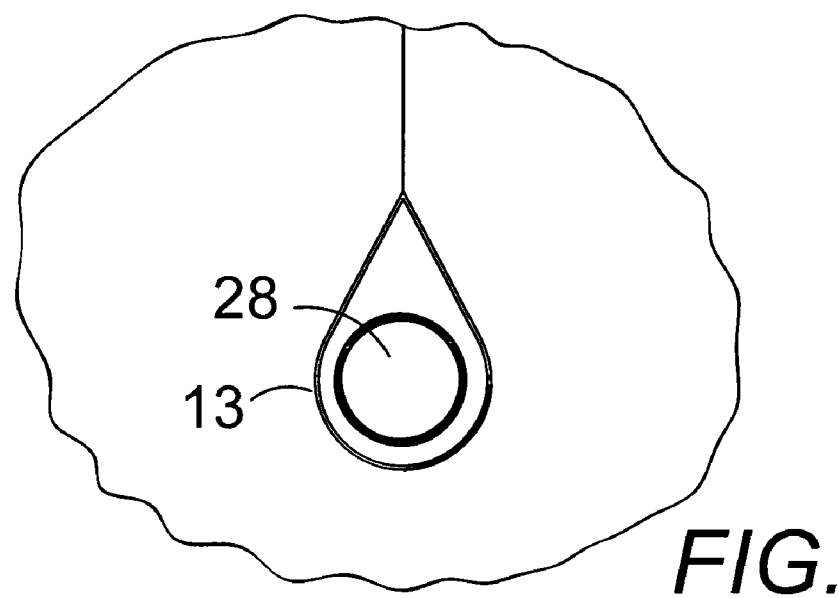
FIG. 12 is a cross sectional view of the elastic placed into a channel that exists around the periphery of the cover stopping at the rear of the vehicle.

The cover 11 stays stored in the pocket 18 until needed as seen in FIGS. 4 and 6. The pocket 18 in FIGS. 4 and 6 opens and the cover 11 is withdrawn from the pocket 18 and deployed over the entire outer area of the passenger compartment including the windshield and mirrors of the vehicle 17, as seen in FIGS. 1 and 3. Once the cover 11 has been deployed the elastic cord 28 can be tightened by pulling on the tension adjustment ring clip 15 as seen in FIG. 11. Once the tension has been set on the elastic 28 in FIG. 11, the cover 11 will be secured around the sides and front of the vehicle 17 by the elastic 28 and at the rear of the vehicle 17 by the bracket 16 as seen in FIG. 1. A snap 77 may be used to keep the cover 11 tight on the bracket 16. In FIG. 1, the side mirrors of the vehicle 17 act as a stop preventing the periphery of the cover 11 from being blown out of position once the elastic 28 in the channel 13 has been tightened.

Once the cover is in place a side skirt 14 as seen in FIGS. 1 and 3, covers any gap between the top rear portion of the vehicle bed 17 and the channel 13 for the elastic 28. Looking at FIG. 1, this skirt 14 ensures that dust, water, or other harmful elements are prevented from entering the vehicle while the cover 11 is deployed.

Figure 13:
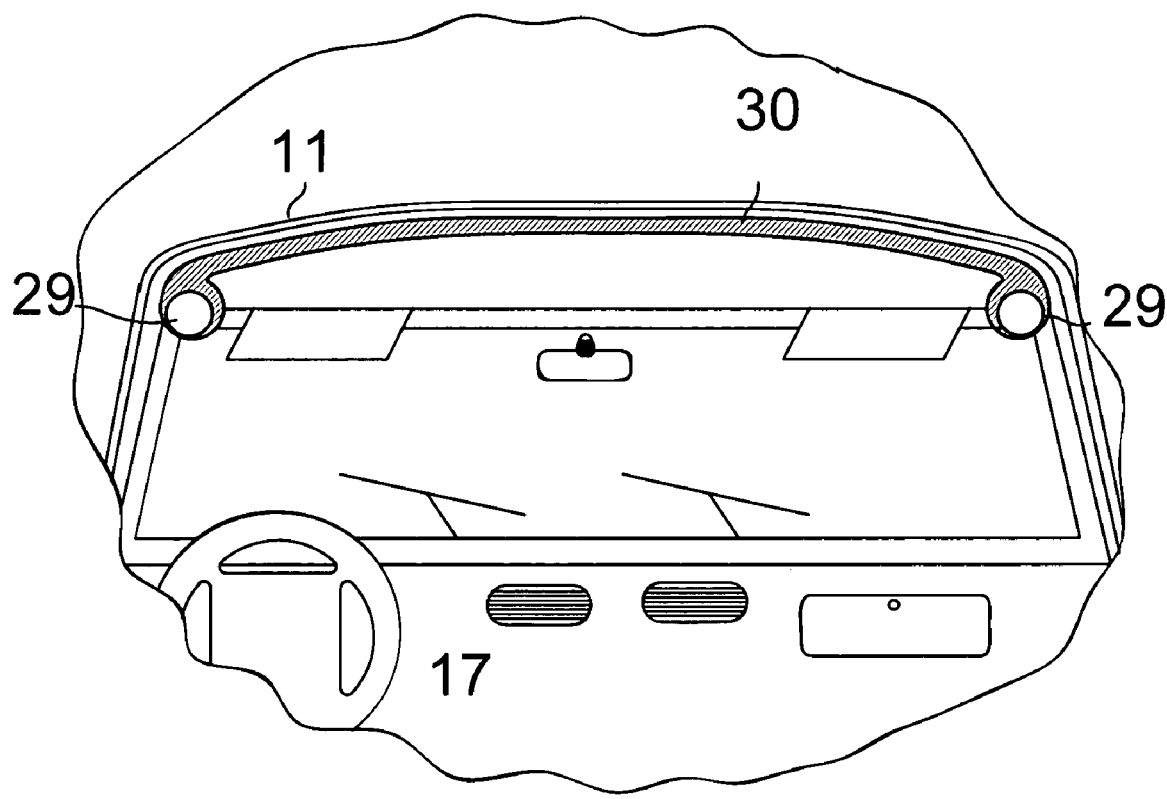
FIG. 13 is a cross sectional view of the vehicle showing a bow used to create a dome over the front passenger compartment of the vehicle.

In FIG. 13, when in wet weather a bow 30, can be placed on the roll bars 29, or sewn into the cover 11, of the vehicle 17 above the front passenger compartment. This creates a dome above the front passenger compartment of the vehicle 17 to prevent pooling of water, ensuring a dry protected interior, as seen in FIG. 13.

On vehicles that frequently use a soft top and like to put the soft top up an optional bracket 31 with a slightly different shape could be used as seen in FIG. 10. In FIG. 10, this shape of the bracket 31 allows the soft top to be installed without interfering with the cover 11 and attachment system in FIGS. 1, 2, and 3.

It is understood that the preceding description is given merely by way of illustration and not in limitation of the invention and that various modifications may be made thereto without departing from the spirit of the invention as claimed.

What is claimed is:

1. A cover and attachment system for a open-top vehicle which is easily deployed, the system comprising:
    a cover to fit over at least a portion of a open-top vehicle body, the cover formed of lightweight, form fitting, waterproof/water-resistant material;
    a pocket sewn into a rear base of the cover for stowing the cover when not in use;
    a first attachment means for fastening the cover to a rear bed of the open-top vehicle so that the cover can be easily deployed or stowed on an interior of the rear bed while fastened to the rear bed;
    at least one secondary means of attachment on a periphery of said cover for use when deployed comprising an edging element around the periphery of the cover;
    a bow for elevating and arching the cover to create a dome over the front passenger compartment of the open-top vehicle to avoid pooling of water when the cover is deployed in heavy rain;
    a partial side skirt to cover a gap between a vehicle side of a rear passenger compartment and the edging element of the cover when deployed; and
    a tension adjustment component to tighten the secondary means of attachment when said cover is deployed.

2. The cover and attachment system of claim 1, wherein the at least one secondary means of attachment comprises an elongated edging material taken from the list of elongated edging materials including elastic, cloth, and cord.

3. The cover and attachment system of claim 2 wherein the tension adjustment component to tighten the secondary means of attachment comprises a ring through which a loop of the elongated edging material is inserted so that the ring slides away from an end of the loop to enlarge the loop for tightening the elongated edging material or the ring slides toward the end of the loop to shorten the loop for loosening the elongated edging material.

4. The cover and attachment system of claim 1 wherein first attachment means for fastening the cover to a rear bed of a vehicle comprises a metal bracket attached to the cover through a bottom peripheral edging sleeve in the cover, the bracket secured to the vehicle.

5. The cover and attachment system of claim 4 further comprising a bracket attached to the vehicle, the bracket having a recessed channel in a top along the length of the bracket and the metal bracket may be inserted into the recessed channel for installing the bracket.

6. The cover and attachment system of claim 4 wherein the bracket comprises a wide U-shaped metal arm having a hole through each end for receiving a threaded means through the hole to attach the bracket to the vehicle.

7. The cover and attachment system of claim 1 further comprising a closing flap having mating strips of hook and loop fasteners for closing the pocket.

8. The cover and attachment system of claim 1 further comprising at least one cover hook on each side of a bottom edge of the cover and at least one mating body hook for the at least one cover hook on the vehicle body.

* * * * *